Aug. 18, 1942.   F. B. HEWEL   2,293,545
CHAIN APPLICATOR
Filed June 22, 1940
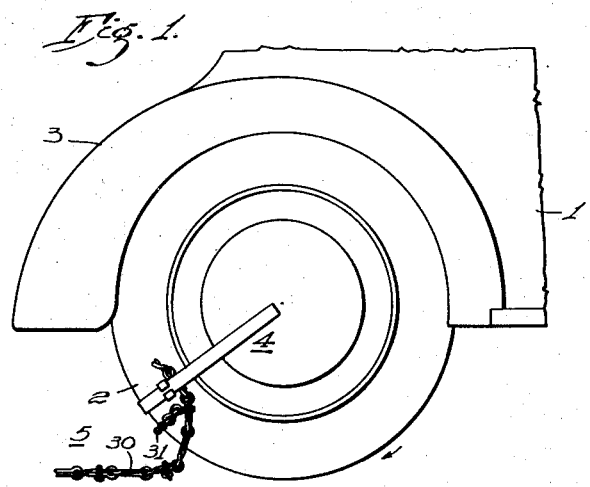
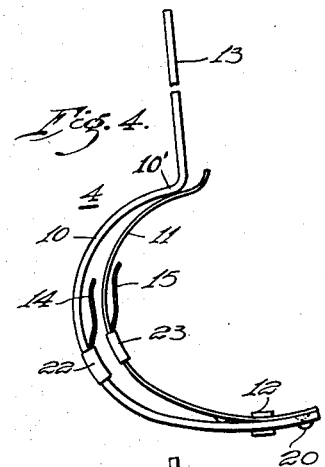
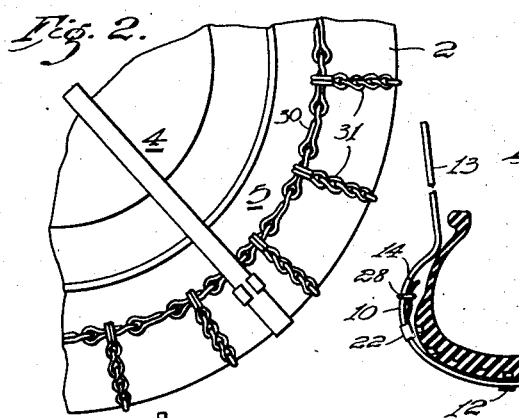
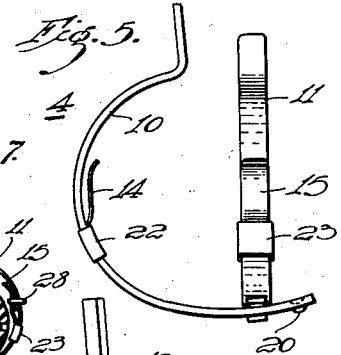
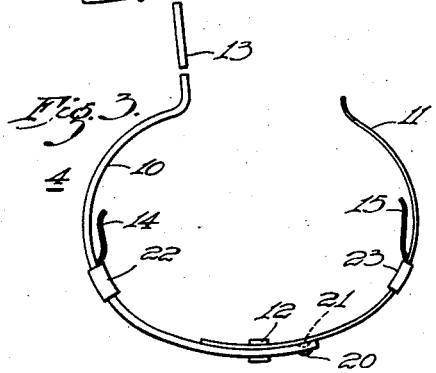
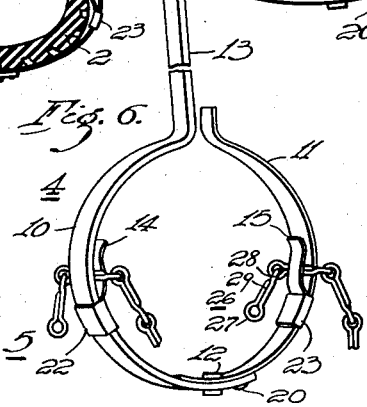
WITNESS
E. C. Leiding.
INVENTOR
Frank B. Hewel
BY
William R. Coley
ATTORNEY Patented Aug. 18, 1942

2,293,545

UNITED STATES PATENT OFFICE 2,293,545

CHAIN APPLICATOR

Frank B. Hewel, Pittsburgh, Pa.

Application June 22, 1940, Serial No. 341,876

2 Claims. (Cl. 81—15.8)

My invention relates to tire chain applicators, and one object of my invention is to provide a relatively simple and inexpensive but highly effective and convenient device of this character.

Another object of my invention is to provide a tire chain applicator comprising a structure adapted to partly encircle and grip a tire, together with resilient gripping means for the tire chain disposed preferably on inside faces of the encircling structure.

A further object of my invention is to provide a structure of the character set forth having its parts substantially centrally pivoted together, thereby to permit one part to nest within the other and causing the device to occupy relatively small space when not in use.

Still another object of my invention is to provide a device of the character in question having a handle attached to one end thereof and extending in the main plane of the device to permit ready manipulation of the device.

Other objects of my invention will become evident from the following detailed description taken in conjunction with the accompanying drawing, wherein:

Figure 1 is a view in side elevation showing an automobile wheel and a tire chain being initially applied thereto by means of my present invention;

Fig. 2 is a partial view of an automobile wheel showing the final position of a tire chain applied by means of my present invention just before my tire chain applicator is removed;

Fig. 3 is a view in front elevation of my tire chain applicator;

Figs. 4 and 5 are detailed views showing different positions that may be assumed by the tire chain applicator parts; and Fig. 6 is a perspective view showing the resilient gripping of a tire chain by means of devices provided in the interior faces of my applicator, and Fig. 7 is a cross-sectional view of a tire to which my applicator and the two side chains are attached.

Referring to the drawing, I have therein shown a fragment of the rear portion 1 of an automobile showing the right-hand rear wheel 2 and a fender 3 thereabove, together with my tire applicator 4 with which is associated a tire chain 5, the applicator being shown in its initial chain-applying position.

My chain applicator comprises two substantially semicircular portions or parts 10 and 11 which together serve to partly encircle and grip a tire, these portions being made of resilient steel strip or other similar material and being hinged or pivoted together at a point 12 in substantially the central plane of the device. It will be noted that part 11 is thinner and, therefore, more flexible than part 10, which is thicker and thus more rigid. A handle member or the like 13 constitutes a continuation of one end of the semi-circular more rigid portion 10, the handle extending in the main plane of the device and being bent at a suitably convenient angle and one that will permit the handle, when in use, to properly clear the wheel hub.

A pair of resilient clips or chain-gripping springs 14 and 15 are respectively disposed on the inside faces of the semi-circular portions 10 and 11 near the mid points thereof. The spring members 14 and 15 are thus disposed substantially opposite each other so that, in use, they are located substantially at the ends of the transverse diameter of the tire, as indicated in Fig. 7, although this exact location is not necessary to achieve the benefits of my present invention.

The spring clips 14 and 15 may be attached to the respective semi-circular portions 10 and 11 in any convenient manner, as by means of clamping or band members 22 and 23, preferably integral with clips 14 and 15, respectively, partially wrapped around the adjacent parts of the semi-circular members 10 and 11, respectively.

In order that my chain applicator may be disposed in a garage or in the rear compartment of the car, for example, and take up a minimum of space, the semi-circular parts 10 and 11, as noted above, are hinged at a central point 12, whereby the part 11 may be nested within the part 10, as clearly shown in Fig. 4. However, when it is desired to use the device, the parts may be moved through the intermediate position shown in Fig. 5, where the parts 10 and 11 are disposed at substantially right angles, into the operative position shown in Fig. 3, where a boss or protuberance 21 on the lower side of the semi-circular portion 11 engages with a hollow portion or depression 20 in the upper side of the semi-circular portion 10 near its lower end. The cooperation of the parts 20 and 21 to lock the portion 10 and 11 in operative position is clearly shown in Fig. 3. It will be understood that other means for locking the parts 10 and 11 in working position may be employed, if desired.

In this way, the parts of my chain applicator are rigidly disposed with respect to each other to serve the desired purpose, and whenever the applicator is not in use, the one part may be nested within the other and it may be laid away, occupying a minimum of space.

Referring now to Fig. 6, the ready application of my device to tire chains will be evident. Any desired tire chain may be applied with my applicator, the chain, as usual, comprising two side chains 30, connected at intervals by cross-chains 31, while any well known form of side chain link may be utilized. I prefer to employ the type shown in Fig. 6, where each link 26 includes two rounded or looped end portions 27 and 28 joined by a double straight portion 29, the two straight parts constituting portion 29 preferably being in contact with each other. By suitably twisting adjacent loop portions 27 and 28 on successive links in opposite directions, as shown, the mid portions 29 occupy substantially the same plane throughout the length of the side chain. It is, therefore, a simple matter to dispose selected straight intermediate portions 29 within the resilient clips 14 and 15 prior to applying the chain to the tire. Preferably the attachments should be made near one end of the chain.

I particularly desire to point out the fact that it is not necessary to carefully hook links over or unhook links from the portions 14 and 15 as in the prior art, but by reason of the resiliency of the clips 14 and 15, the chains may be readily slid or forced into these clips, whereafter they will be resiliently held in position.

Assuming that the two side chains 30 of tire chain 5 have been attached to my applicator, as shown in Fig. 6, the handle 13 is then grasped and the curved portions 10 and 11 of the applicator are drawn over the tire at a point preferably below the rear end of the rear fender 3, as illustrated in Fig. 1 in elevation and in Fig. 7 in cross-section.

The car is then slowly driven in a forward direction, whereby the chain is gradually disposed or rolls over the periphery of the tire until the free end is located beneath the front end of the fender, which occurs when my tire chain applicator 4 has made substantially a complete revolution in a forward or clockwise direction and occupies the position shown in Fig. 2. The free end of the chain may then be readily fastened to the other end, as shown in Fig. 2, it being noted that both ends of the side chain are readily available for this purpose.

My chain applicator may then be readily slid off the tire by grasping the handle and pushing thereon, this single action at the same time serving to dislodge the spring clips 14 and 15 from the links 26 previously resiliently gripped thereby. In this way, it is unnecessary, because of the provision of the spring clips 14 and 15, to go to the trouble of actually unhooking links on the side chain from hooks, as was necessary in the prior art.

It will be readily appreciated that, by the use of two of my applicators, one on each rear tire, both of the two tire chains usually employed may be applied at the same time in the manner just described.

However, if desired, my applicator may be used in a reverse manner, that is, it may be applied to the front side of the tire below the fender 3, and the car then driven forwardly over the chain. In either case, the applicator is readily attached and detached, and permits quick and easy application of the chain to the tire.

It will be noted in Fig. 4 that the handle portion 13 is bent outwardly in a manner to form an inwardly extending projection 10' near the free end of part 10. When the other part 11 is folded towards part 10, the projection 10' frictionally engages part 11 as shown in Fig. 4 and the intermediate portions of the two parts are spaced from one another. The clip 14 is positioned between these parts in said space when the parts are folded.

It will be seen that I have thus provided a simple and inexpensive tire chain applicator by means of which a tire chain may be readily initially attached to a tire and, after being properly secured thereto, the applicator may be readily slid off. Consequently, a minimum amount of labor and a minimum likelihood of soiling sleeves or other clothing are encountered. At the same time, after the applicator has been used, it may be folded into a relatively small compass by nesting the one portion within the other for storage.

I do not wish to be restricted to the specific structural details or arrangement of parts herein set forth, as various modifications thereof may be effected without departing from the spirit and scope of my invention. I desire, therefore, that only such limitations shall be imposed thereon as are indicated in the appended claims.

I claim as my invention:

1. A tire chain applicator comprising a two-part structure adapted to partly encircle a tire, each said part being arcuate in shape, means for pivotally connecting said parts adjacent corresponding ends to permit the parts to move relatively from an open tire gripping position to a nested folded position, one of said parts being formed to provide an inwardly extending projection positioned to engage the free end of the other part to frictionally hold the parts in nested position and to maintain said other part spaced from the first-named part intermediate the ends thereof, each part having a chain-engaging clip secured thereto intermediate the ends thereof, the clip on said first-named part being positioned between the parts when in their nested position.

2. A tire chain applicator comprising a two-part structure adapted to partly encircle a tire, each said part being arcuate in shape and the first part being more rigid than the second part, means for pivotally connecting said parts adjacent corresponding ends to permit the parts to move relatively from an open tire gripping position to a nested folded position, said first more rigid part constituting the outer nesting member and being formed to provide an inwardly extending projection positioned to frictionally engage the free end of the second less rigid part constituting the inner nesting member and maintain the second part spaced from the first part intermediate the ends thereof, each part having a chain-engaging clip secured thereto intermediate the ends thereof, the clip on said first more rigid part being positioned between the parts when in their nested position.

FRANK B. HEWEL.